(12) United States Patent
Millon

(10) Patent No.: US 10,326,118 B2
(45) Date of Patent: Jun. 18, 2019

(54) BATTERY MODULE INCLUDING COVER ASSEMBLY

(71) Applicants: Bosch Battery Systems Gmbh, Stuttgart-Feuerbach (DE); Robert Bosch GmbH, Stuttgart (DE)

(72) Inventor: Christopher Millon, Grand Blanc, MI (US)

(73) Assignees: Bosch Battery Systems GmbH, Stuttgart (DE); Robert Bosch GmbH, Stuttgart (DE)

( * ) Notice: Subject to any disclaimer, the term of this patent is extended or adjusted under 35 U.S.C. 154(b) by 292 days.

(21) Appl. No.: 15/158,093

(22) Filed: May 18, 2016

(65) Prior Publication Data

US 2017/0338454 A1 Nov. 23, 2017

(51) Int. Cl.
| | |
|---|---|
| *H01M 2/10* | (2006.01) |
| *H01M 2/02* | (2006.01) |
| *H01M 2/30* | (2006.01) |
| *H01M 2/20* | (2006.01) |
| *H01M 10/65* | (2014.01) |
| *H01M 10/6556* | (2014.01) |
| *H01M 10/62* | (2014.01) |
| *H01M 10/61* | (2014.01) |
| *H01M 10/613* | (2014.01) |
| *H01M 2/06* | (2006.01) |
| *H01M 10/625* | (2014.01) |

(52) U.S. Cl.
CPC ......... *H01M 2/1077* (2013.01); *H01M 2/024* (2013.01); *H01M 2/06* (2013.01); *H01M 2/206* (2013.01); *H01M 2/305* (2013.01); *H01M 10/613* (2015.04); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 7,955,729 | B2 | 6/2011 | Onuki et al. |
| 8,465,866 | B2 | 6/2013 | Kim |
| 9,052,148 | B2 | 6/2015 | Eckstein et al. |
| 9,083,031 | B2 | 7/2015 | Bolden et al. |
| 2009/0061309 | A1 | 3/2009 | Ushio et al. |

(Continued)

FOREIGN PATENT DOCUMENTS

| | | | |
|---|---|---|---|
| CN | 104282855 | | 1/2015 |
| CN | 104282855 A | * | 1/2015 |

(Continued)

OTHER PUBLICATIONS

PCT International Search Report for PCT/EP2017/059796.

*Primary Examiner* — Daniel S Gatewood
(74) *Attorney, Agent, or Firm* — Kelly McGlashen; Maginot Moore & Beck LLP

(57) ABSTRACT

The present invention relates to a battery module for storage of electrochemical cells, including a cover assembly including an inner frame that encloses an end of the cells and applies a compressive force thereto, an intermediate frame that is snap fit to an outer surface of the inner frame and supports ancillary structures of the battery system, and an outer cover that is snap fit to an outer surface of the intermediate frame.

16 Claims, 6 Drawing Sheets

(56) References Cited

U.S. PATENT DOCUMENTS

| | | |
|---|---|---|
| 2009/0214936 A1 | 8/2009 | Yang et al. |
| 2011/0256446 A1* | 10/2011 | Bronczyk ............ H01M 2/1077 429/163 |
| 2012/0107663 A1 | 5/2012 | Burgers et al. |
| 2012/0156543 A1 | 6/2012 | Cicero et al. |
| 2012/0244397 A1 | 9/2012 | TenHouten et al. |
| 2013/0095360 A1 | 4/2013 | Niedzwiecki et al. |
| 2013/0288530 A1 | 10/2013 | Zhao |
| 2014/0127552 A1 | 5/2014 | Lu et al. |
| 2014/0234690 A1 | 8/2014 | Lee et al. |
| 2014/0338995 A1 | 11/2014 | McLaughlin et al. |
| 2015/0044538 A1 | 2/2015 | Katayama et al. |

FOREIGN PATENT DOCUMENTS

| | | | |
|---|---|---|---|
| DE | 102013020790 | 6/2015 | |
| DE | 102013020790 A1 * | 6/2015 | .......... H01M 2/1077 |

* cited by examiner

BATTERY MODULE INCLUDING COVER ASSEMBLY

BACKGROUND

1. Field of the Invention

The present invention relates to a battery module for storage of electrochemical cells, including a cover assembly including an inner frame that encloses an end of the cells and applies a compressive force thereto.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are closely arranged in two or three dimensional arrays, and are electrically connected in series or in parallel. Likewise, the battery modules within a battery pack are electrically connected in series or in parallel.

Some conventional battery modules and battery packs have housings that are formed of welded steel components. However, the welding process used to form the housings can be expensive, and may also result in creation of undesirable conductive particles within the housing, and can sometimes have a high failure rate. It is desirable to provide an improved housing that is less expensive to manufacture and is reliable.

SUMMARY

In some aspects, a battery module is configured to support an array of electrochemical cells. The module includes a cover assembly, the cover assembly having an outer cover, an, inner frame and an intermediate frame disposed between the outer cover and the inner frame. The inner frame includes an inner plate having an inner plate outward-facing surface that is bordered by an inner plate peripheral edge. The inner plate has access openings formed in the inner plate outward-facing surface that are spaced apart from the inner plate peripheral edge. The inner frame includes a skirt protruding from the inner plate peripheral edge in a direction perpendicular to the inner plate outward-facing surface. The skirt includes a skirt inward-facing surface that is joined to the inner plate peripheral edge, and a skirt outward-facing surface that is opposed to the skirt inward-facing surface. The inner frame includes a foot extending outward from the skirt outward-facing surface, the foot extending in a direction parallel to the inner plate. The intermediate frame is secured to the inner frame by a snap-fit connection, and the outer cover is secured to the intermediate frame by a snap-fit connection.

The battery module may include one or more of the following features: The intermediate frame includes a sidewall, and a latticed element extending between opposed inner surfaces of the sidewall. The latticed element includes a first surface facing the outer cover and a second surface facing the inner frame. The latticed element includes lattice openings that align with the access openings in a direction perpendicular to the first surface. The intermediate frame includes frame latches that depend from the sidewall in a direction normal to the second surface. The skirt includes spaced-apart latch openings that are configured to receive and engage the frame latches, whereby the intermediate frame is secured to the inner frame. The outer cover includes an outer plate having an outer plate outward-facing surface, an outer plate inward facing surface that is opposed to the outer plate outward-facing surface and faces the intermediate frame, and an outer plate peripheral edge that extends between the outer plate outward facing surface and the outer plate inward-facing surface. The outer cover includes outer cover latches that depend from the outer plate peripheral edge in a direction normal to the outer plate inward-facing surface. The outer plate peripheral edge faces an inner surface of the intermediate frame sidewall, and the outer cover latches are received in, and engage with, recesses formed in an edge of the intermediate frame sidewall. A gusset extends between the skirt and the foot.

In some aspects, a battery pack includes a battery pack housing, and a battery module disposed within the battery pack housing. The battery module includes a cover assembly, and the cover assembly includes an outer cover, an inner frame, and an intermediate frame disposed between the outer cover and the inner frame. The inner frame includes an inner plate having an inner plate outward-facing surface that is bordered by an inner plate peripheral edge. The inner plate has access openings formed in the inner plate outward-facing surface that are spaced apart from the inner plate peripheral edge. The inner frame includes a skirt protruding from the inner plate peripheral edge in a direction perpendicular to the inner plate outward-facing surface. The skirt includes a skirt inward-facing surface that is joined to the inner plate peripheral edge, and a skirt outward-facing surface that is opposed to the skirt inward-facing surface. The inner frame includes a foot extending outward from the skirt outward-facing surface, the foot extending in a direction parallel to the inner plate. The intermediate frame is secured to the inner frame by a snap-fit connection, and the outer cover is secured to the intermediate frame by a snap-fit connection.

The battery pack may include one or more of the following features: The intermediate frame comprises a sidewall, and a latticed element extending between opposed inner surfaces of the sidewall. The latticed element includes a first surface facing the outer cover and a second surface facing the inner frame, and the latticed element includes lattice openings that align with the access openings in a direction perpendicular to the first surface. The intermediate frame includes frame latches that depend from the sidewall in a direction normal to the second surface. The skirt includes spaced-apart latch openings that are configured to receive and engage the frame latches, whereby the intermediate frame is secured to the inner frame. The outer cover includes an outer plate having an outer plate outward-facing surface, an outer plate inward facing surface that is opposed to the outer plate outward-facing surface and faces the intermediate frame, and an outer plate peripheral edge that extends between the outer plate outward facing surface and the outer plate inward-facing surface. The outer cover includes outer cover latches that depend from the outer plate peripheral edge in a direction normal to the outer plate inward-facing surface. The outer plate peripheral edge faces an inner surface of the intermediate frame sidewall, and the outer cover latches are received in, and engage with, recesses formed in an edge of the intermediate frame sidewall. A gusset extends between the skirt and the foot. The battery pack housing cooperates with the cover assembly to support the array of electrochemical cells. The battery pack housing includes electrochemical cells disposed in the module housing, a base on which the array of electrochemical cells is supported, and a support surface that is disposed between the inner plate and the base, and extends parallel to the inner plate. A distance between the support surface and the base in a direction perpendicular to the plate outward-facing surface defines a support offset. The foot is secured to the support surface, and the distance between the foot and the inner plate in a direction perpendicular to the plate outward-facing surface defines a foot offset. In addition, a sum of the foot offset and support offset is less than a dimension of one of the electrochemical cells in a direction perpendicular to the plate outward-facing surface whereby the inner frame applies a force to the electrochemical cells. The support offset has a value that is greater than zero. The base includes fluid passageways, and the electrochemical cells are in direct contact with the base.

In some aspects, a method of supporting an array of electrochemical cells within a housing includes providing a housing, the housing including a base on which the array of electrochemical cells is supported, and a support surface that is disposed between the inner plate and the base, and extends parallel to the inner plate. A distance between the support surface and the base in a direction perpendicular to the plate outward-facing surface defines a support offset. The method includes providing an array of electrochemical cells, each cell including a prismatic housing having a first end, a second end, a sidewall that extends between the first end and the second end, a cell axis that is perpendicular to the first and second ends, and a terminal disposed on the first end. There are cells arranged within the housing such that the sidewall of one cell faces the sidewall of an adjacent cell, and the sidewalls of the outermost cells of the array face a structural element of the housing. The method includes providing a cover assembly that comprises an inner frame. The inner frame includes an inner plate having a plate outward-facing surface that is bordered by a peripheral edge, the inner plate having openings formed in the plate outward-facing surface that are spaced apart from the peripheral edge. The inner frame includes a skirt having a skirt inward-facing surface that is joined to the peripheral edge, and a skirt outward-facing surface that is opposed to the skirt inward-facing surface. The skirt protrudes from the peripheral edge in a direction perpendicular to the plate outward-facing surface. The inner frame includes a foot extending outward from the skirt outward-facing surface. The foot extends in a direction parallel to the plate outward-facing surface, and the distance between the foot and the inner plate in a direction parallel to the cell axis defines a foot offset. In addition, the method includes disposing the inner frame on the array of cells such that the inner plate overlies the first end of each cell, the foot is secured to the structural element, and a sum of the foot offset and the support offset is less than a dimension of the cell in a direction parallel to the cell axis whereby the inner frame applies a force to the first end of the cells of the array.

The method includes one or more of the following method steps and/or features: The cover assembly further comprises an outer cover, and an intermediate frame disposed between the outer cover and the inner frame. The intermediate frame is secured to the inner frame by a snap-fit connection, and the outer cover being secured to the intermediate frame by a snap-fit connection. The method further includes supporting the array of electrochemical cells within the housing in such a way that the outer cover and intermediate frame are free of the force applied to the first end of the cells of the array. The support offset has a value that is greater than zero.

In some aspects, a battery module cover includes an inner frame. The inner frame includes an inner plate having an inner plate outward-facing surface that is bordered by an inner plate peripheral edge. The inner plate has access openings formed in the inner plate outward-facing surface that are spaced apart from the inner plate peripheral edge. The inner frame includes a skirt protruding from the inner plate peripheral edge in a direction perpendicular to the inner plate outward-facing surface. The skirt includes a skirt inward-facing surface that is joined to the inner plate peripheral edge, and a skirt outward-facing surface that is opposed to the skirt inward-facing surface. In addition, the inner frame includes a foot extending outward from the skirt outward-facing surface, the foot extending in a direction parallel to the plate outward-facing surface. A gusset extends between the skirt and the foot, and the skirt includes spaced-apart latch openings that are configured to receive and engage frame latches of an overlying structure whereby the overlying structure can be secured to the inner frame.

In some aspects, a module housing used to support and restrain an array of electrochemical cells includes a housing in which the welded joints used to form the housing are replaced by snap-fit connections. The module housing includes a cover assembly that cooperates with a cell-encircling band and a pair of end plates to restrain and support the cell array. The cover assembly includes an outer cover, a steel inner frame that faces the cells, and a plastic intermediate frame disposed between the outer cover and the inner frame. The intermediate frame is used to support and position a flex foil cell connection system in a proper location relative to terminals of the cells of the array. The intermediate frame is secured to the inner frame by snap-fit connections, and the outer cover is secured to the intermediate frame by snap-fit connections. This can be compared to some conventional battery modules and battery packs that have housings that are formed of welded steel components. By using snap-fit connections to form the housings, the welding process including related creation of undesirable conductive particles within the housing, can be avoided.

In addition, the inner frame includes depending feet that are secured to an external support surface such as an internal rail of the battery pack housing, and the inner frame is dimensioned such that the inner frame applies a force to the array when secured to the rail. By securing the cells using the inner frame, the cell array is stably supported with minimal vibration. In addition, since the intermediate frame that supports the cell connection system is on an opposed side of the inner frame relative to the cells, the cell connection system is not under a compressive load, whereby the connections of the cell connection system are made more reliable. Thus, the module housing permits secure and reliable cell restraint while also permitting reliable interconnections between the cells disposed in the module housing.

DETAILED DESCRIPTION

Figure 1:
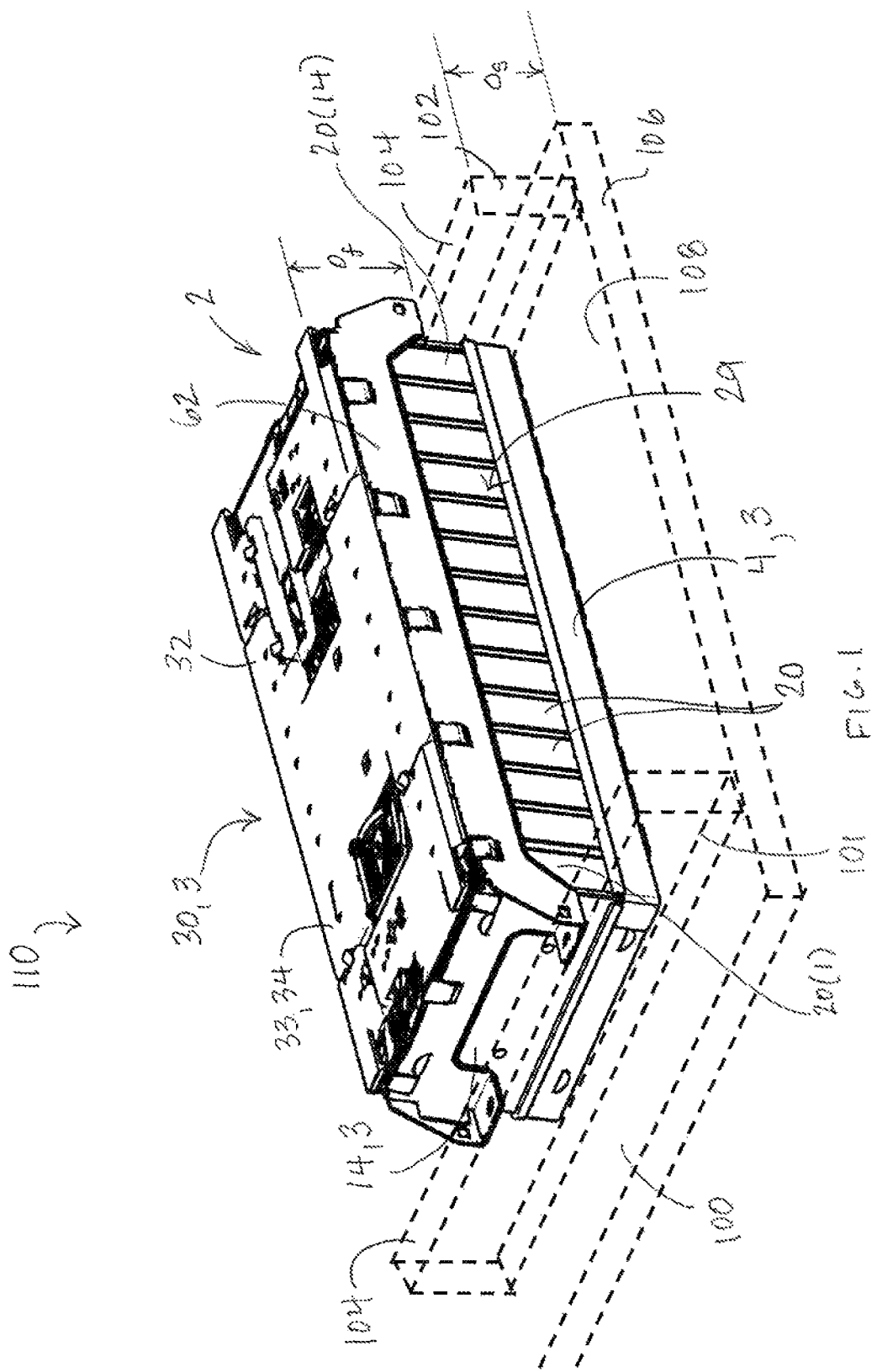
FIG. 1 is a perspective view of a portion of a battery pack (shown in dashed lines) including a module illustrating an array of cells disposed in battery module.
Figure 2:
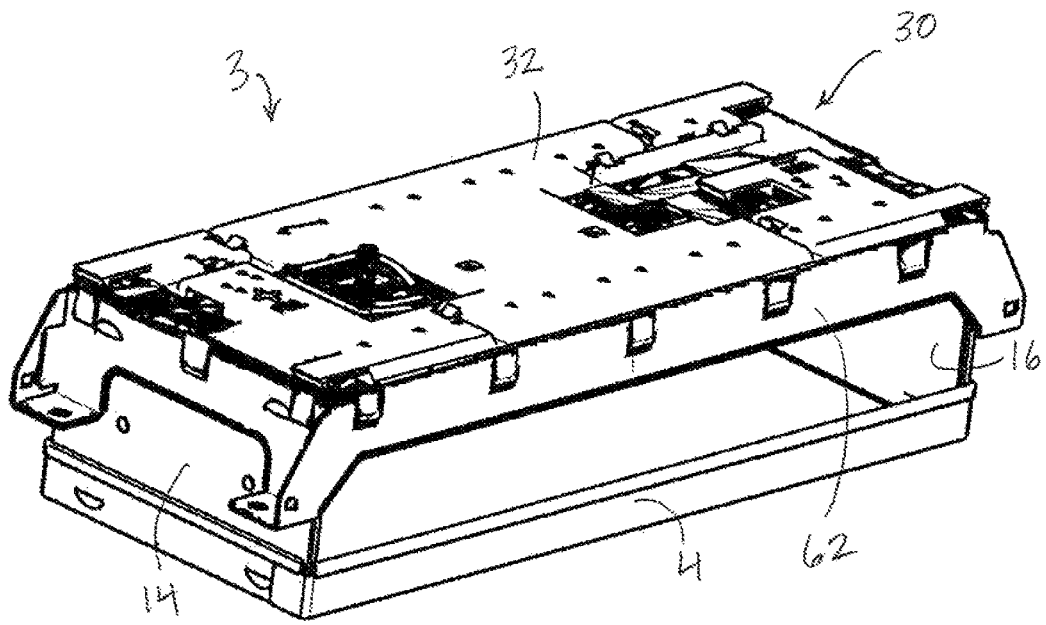
FIG. 2 is perspective view of the module of FIG. 1 with the cells omitted.

Referring to FIGS. 1-2, a battery module 2 is a power generation and storage device that includes an array 29 of electrochemical cells 20 that are electrically interconnected and stored in an organized manner within a module housing 3. The module housing 3 includes cover assembly 30, a band 4 that encircles the cell array 29 at a location spaced apart from an upper end of the cells 20, and a pair of end plates 14, 16 that bracket opposed ends of the cell array 29 and abut inner surfaces of the cover assembly 30 and the band 4. The elements of the module housing 3, including the cover assembly 30, the band 4 and the pair of end plates 14, 16, cooperate to restrain and support the cell array 29 within a housing 100 of a battery pack 110.

The battery pack housing 100 may include a generally planar base 106 on which the battery module 2 is supported. The base 106 has an inward-facing base surface 108 that faces and confronts one end of the cells 20. In some embodiments, the base 106 may provide cell cooling or heating features. For example, the base 106 may be formed of, or coated with, a thermally conductive material, may incorporate fluid passages (not shown) for receiving a cooling or heating fluid, or provide other appropriate temperature control features.

The battery pack housing 100 also includes parallel first and second rails 101, 102 that are spaced apart along the base 106 a distance corresponding to a length of the battery module 2, as discussed further below. Each rail 101, 102 provides a support surface 104 that extends in parallel to and faces away from the base 106. In the illustrated embodiment, the rails 101, 102 rest on the base 106, but are not required to do so. For example, in other embodiments, the rails 101, 102 may be supported above the base 106 by other portions (not shown) of the battery pack housing 100. In either case, the rails 101, 102 are arranged so that the support surface 104 is disposed between the base 106 and an upper end of the cell 20. A support offset $o_s$ is defined as the distance between the support surface 104 and the base 106 in a direction perpendicular to the base 106. In most embodiments, but not all, the support offset $o_s$ has a value that is greater than zero.

Figure 3:
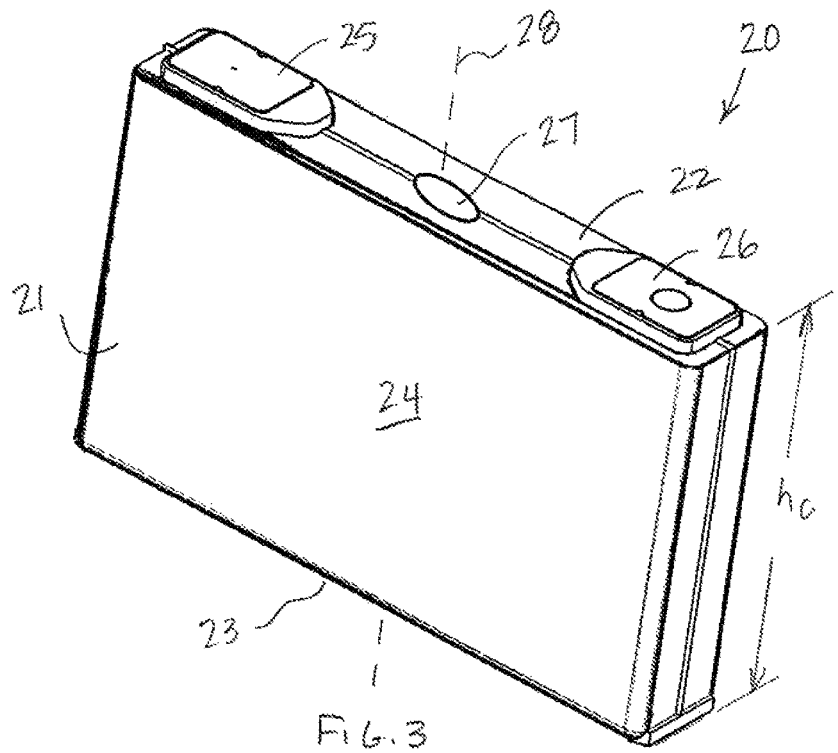
FIG. 3 is a perspective view of a prismatic cell.

Referring to FIG. 3, the cells 20 are lithium-ion cells that include a housing 21 that encloses an electrode assembly (not shown) and an electrolyte to form a power generation and storage unit. The electrode assembly includes at least one positive electrode and at least one negative electrode that are separated by at least one separator. The positive and negative electrodes each have a layered structure to facilitate insertion and/or movement of lithium-ions. The electrodes and separator are elongate strips of material that are stacked and then wound about an elliptically shaped mandrel to form an elliptically-shaped or race track-shaped jelly roll assembly. The cell housing 21 has a rectangular prism shape (e.g., prismatic), and includes a first end 22, and a second end 23 opposed to the first end 22, and a four-sided sidewall 24 that joins the first end 22 to the second end 23. The electrode assembly is disposed in the cell housing 21 such that the winding axis 28 (e.g., the axis about which the electrodes and separators are wound) extends through the first and second ends 22, 23.

A positive terminal 25 that is electrically connected to the positive electrode(s), and a negative terminal 26 that is electrically connected to the negative electrode(s) each protrude out of the housing 21 at the cell first end 22. In addition, a gas-relief vent 27 is provided in the first end 22 at a location between the positive and negative terminals 25, 26.

The electrode assembly experiences dimensional changes during battery charge and discharge. This is due at least in part to expansion of the layered structure of the positive and negative electrodes in the electrode thickness direction due to expansion of the active materials during cycling. The expansion of the jelly roll electrode assembly within the cell housing 20 results in "cell growth". which corresponds to the outward bowing of opposed surfaces of the cell housing sidewall 24 in a direction transverse to the winding axis 28. The module housing 3 includes features which accommodate the growth of the cells 20 disposed therein, as discussed further below.

Referring again to FIGS. 1 and 2, the array 29 of cells 20 is disposed in the module housing 3. For example, in the illustrated embodiment, the cell array 29 includes a single row of fourteen cells 20 arranged sidewall-by-sidewall such that the first end 22 of each cell 20 faces, and is surrounded by, the cover assembly 30. In some embodiments, an insulating separator plate (not shown) may be disposed between facing surfaces of adjacent cells 20. The cell array 29 is arranged within the battery module housing 3 such that the sidewall 24 of an outermost cell 20(1) at one end of the row of cells 20 faces and abuts a first end plate 14 of the module housing 3, and the sidewall 24 of an outermost cell 2(14) at the opposed end of the row of cells 20 faces and abuts a second end plate 16 of the module housing 3.

Figure 4:
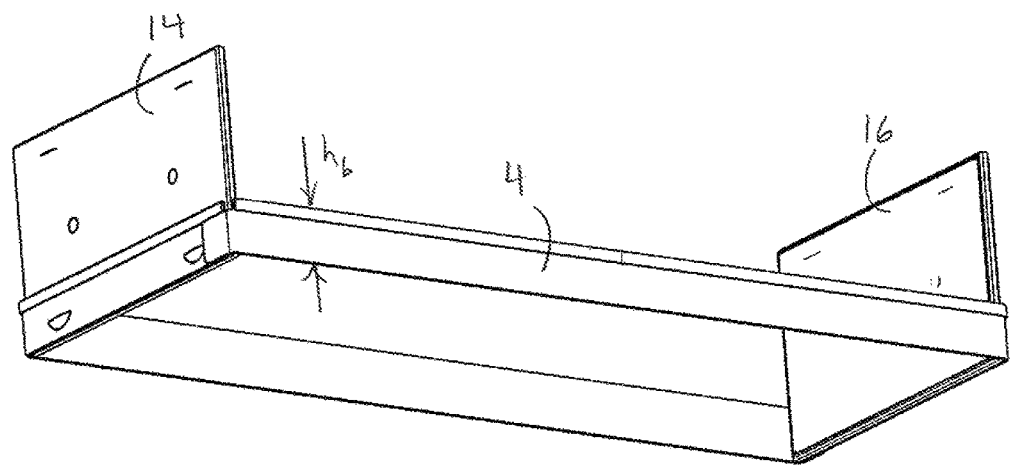
FIG. 4 is a perspective view of the end plates assembled with the band.
Figure 5:
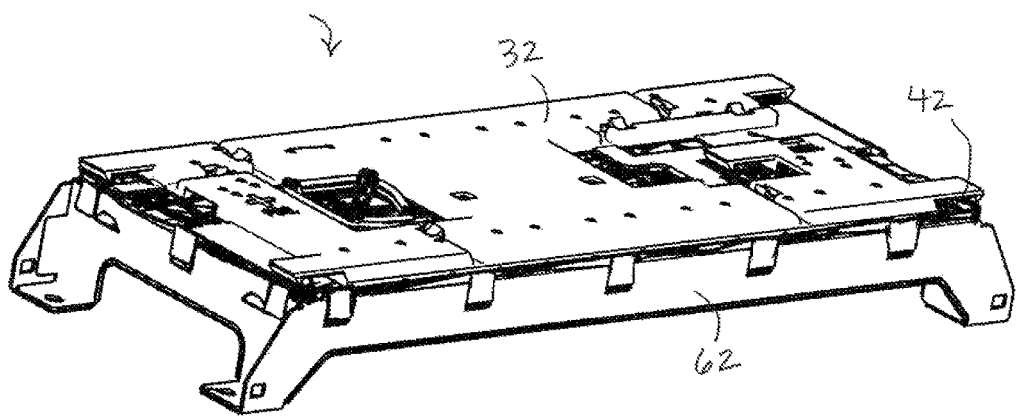
FIG. 5 is a perspective view of the cover assembly.
Figure 6:
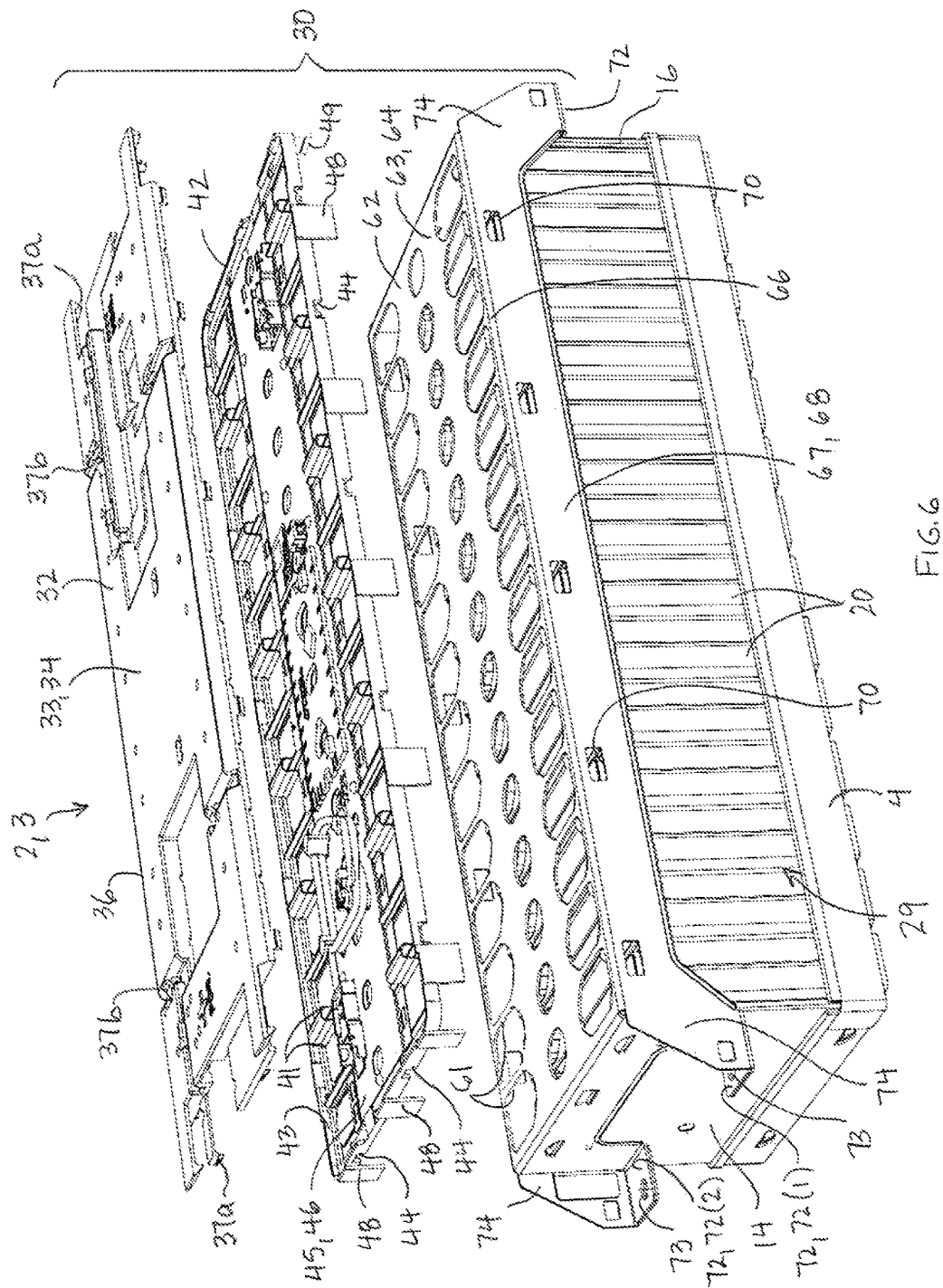
FIG. 6 is perspective view of the module of FIG. 1 with the cover assembly shown as exploded as seen from above.
Figure 7:
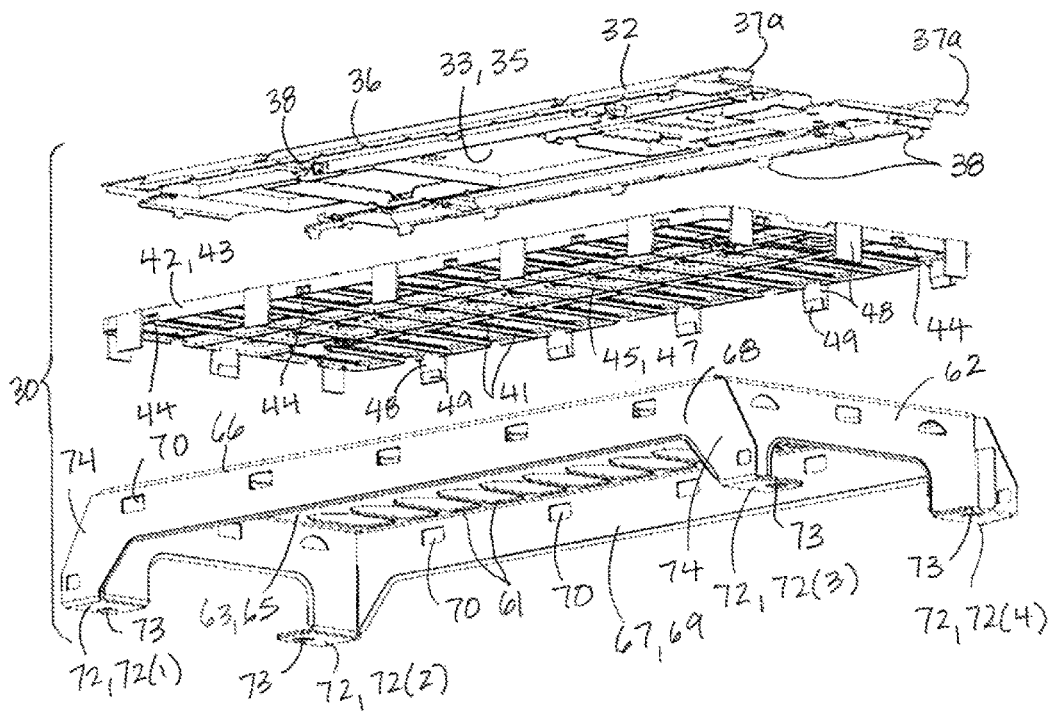
FIG. 7 is an exploded perspective view of the cover assembly as seen from one side and below.
Figure 8:
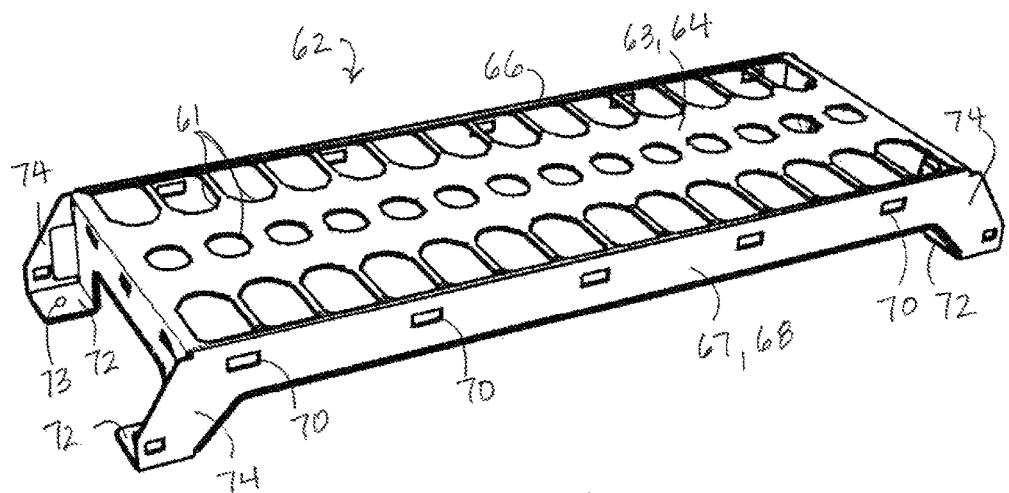
FIG. 8 is a top perspective view of the inner frame of the cover assembly.
Figure 9:
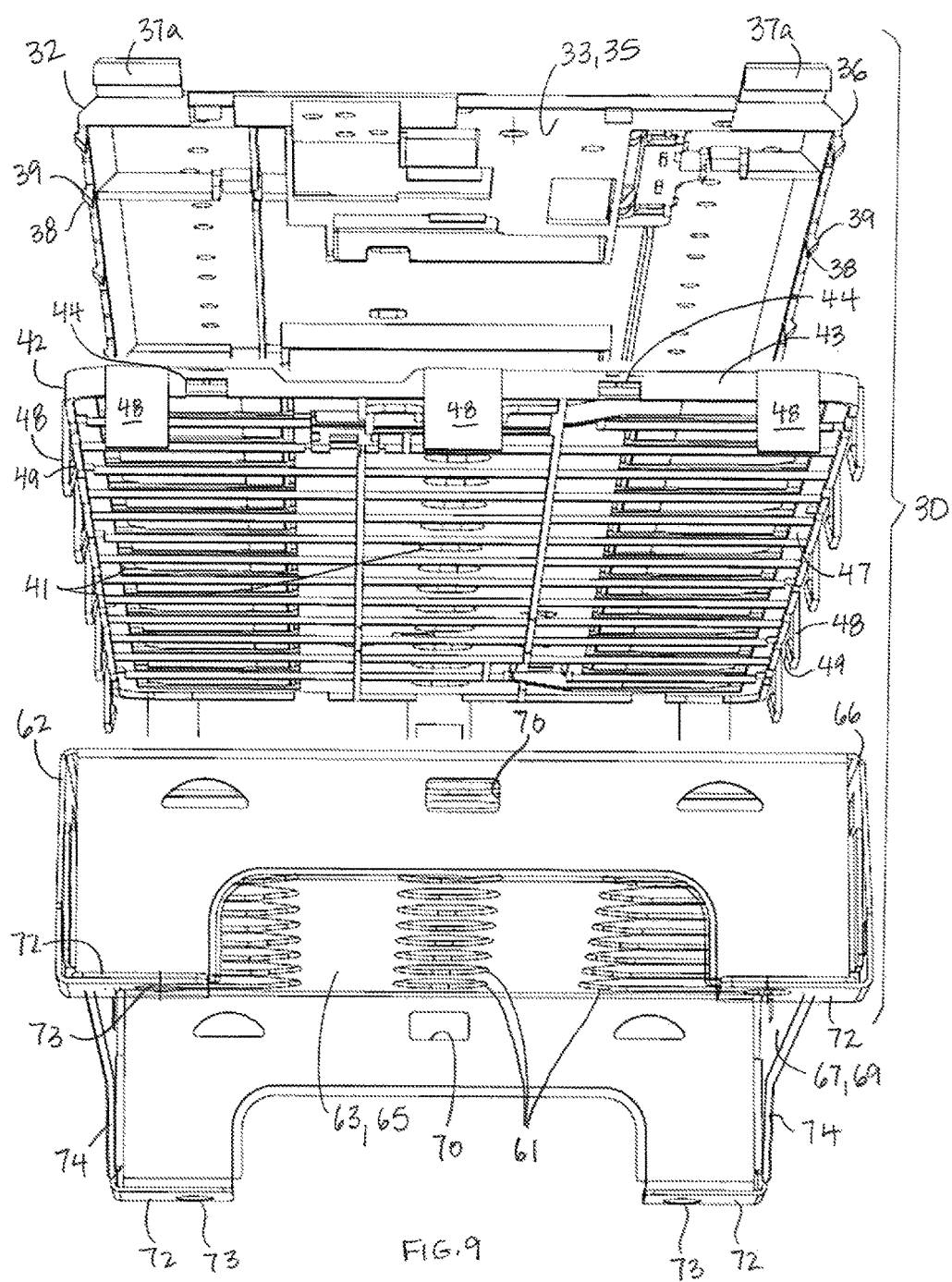
FIG. 9 is an exploded perspective view of the cover assembly as seen from one end and below.

Referring to FIGS. 4 and 5, the module housing 3, which includes cover assembly 30, the band 4 that encircles the cell array 29, and the pair of end plates 14, 16 that bracket opposed ends of the cell array 29, cooperate to restrain and support the cell array 29 within a battery pack housing 100.

The band 4 is a rigid strip of material that is formed into a rectangular loop to correspond to the shape of the circumference of the cell array 29. The band 4 is smaller in height than a height of the cell 20, where the term "cell height" refers to the distance between the cell first and second ends 22, 23. For example, the height $h_b$ of the band 4 is in a range of five percent to thirty-five percent of the height $h_c$ of the cell 20. In the illustrated embodiment, the height $h_b$ of the band 4 is in a range of fifteen percent to twenty-five percent of the height $h_c$ of the cell 20. Moreover, the band 4 is positioned so as to surround the cell sidewalls 24 at the second ends 23 of the cells 20. The band 4 overlies the sidewalls 24 of the cells, and does not wrap around to overlie the cell second ends 23. By this arrangement, when the cells 20 are disposed within the battery module housing 2, the cell second ends 23 rest directly on the thermally conductive base 106 of the battery pack housing 100, whereby temperature control of the cell 20 is facilitated.

The end plates 14, 16 are positioned at opposed ends of the row of cells 20 so as to be disposed inside the band 4 and the cover assembly 30. In particular, the end plates 14, 16 are disposed between the outermost cells 20(1), 20(14) of the cell array 29 and both the band 4 and the cover assembly 30. The end plates 14, 16 are sufficiently rigid to retain the cells 20 in an organized manner within the module housing 3, while being sufficiently flexible to accommodate at least some cell growth in a direction along the row of cells. The end plates 14. 16 are shaped and dimensioned to correspond to the shape and dimensions of the portions of the cell sidewall 24 that it faces. For example, in the illustrated embodiment, the end plates 14, 16 have a rectangular peripheral shape having the same dimensions as the surface of the cell 20 that it faces.

Referring to FIGS. 4 and 6-9, the cover assembly 30 overlies and encloses a first end 22 of the cells 20 of the cell array 29, and also wraps around to overlie and encircle a portion of the sidewalls 24 of the cells 20 of the cell array 29. The cover assembly 30 helps to retain the cells 20 in an organized and stably packed manner within the battery module 2, and to secure the battery module 2 to the battery pack housing 100. In addition, the cover assembly 30 supports other module components including a cell connection system (CSS) in a desired position relative to the cells 20, and covers and protects the terminals 25, 26 at the first ends 22 of the cells 20. The cover assembly 30 includes an outer cover 32, an inner frame 62, and an intermediate frame 42 disposed between the outer cover 32 and the inner frame 62. The outer cover 32, the intermediate frame 42 and the inner cover 62 will now be described in detail.

The outer cover 32 includes a rigid, thin outer plate 33 having an outward-facing surface 34, an inward facing surface 35 that is opposed to the outward-facing surface 34 and faces the intermediate frame 42, and an outer plate peripheral edge 36 that extends between the outward facing surface 34 and the inward-facing surface 35. The outer cover 32 is provided with outer cover latches 38 that depend from the outer plate peripheral edge 36 in a direction normal to the inward-facing surface 35 (e.g. in a direction toward the intermediate frame 42). The outer cover latches 38 terminate in hooked ends 39 that are configured to be received in and engage with recesses 44 provided along an inward-facing edge of a sidewall 43 of the intermediate frame 42. The hooked ends 39 cooperate with the recesses 44 by a snap fit connection to retain the outer cover 32 on an outward-facing surface 46 of the intermediate frame 42. The outer plate peripheral edge 36 is dimensioned to be slightly smaller than a peripheral dimension of the intermediate frame 42 such that the outer cover latches 38 face an inside surface of the intermediate frame sidewall 43. In particular, the outer cover 32 is assembled with the intermediate frame 42 such that the outer plate peripheral edge 36 faces an inner surface of the intermediate frame sidewall 43 while the outer cover latches 38 are received in, and engaged with, the recesses 44.

The outward facing surface 34 of the outer cover may optionally include surface features that are configured to engage ancillary structures and devices of the battery pack 102 such as electrical cables, bus bars, etc., and maintain them in a fixed position relative to the outer cover 32. For example, various types of outward-facing retainers 37a, 37b, may be formed integrally with the outer cover 32 and protrude from the outward facing surface, the inward facing surface 35 and/or the outer plate peripheral edge 36.

The intermediate frame 42 includes the sidewall 43 that defines a periphery of the intermediate frame 42, and a thin, latticed element 45 that extends between opposed inner surfaces of the sidewall 43. The latticed element 45 has a first, outward-facing surface 46 that faces the outer cover 32, and a second, inward-facing surface 47 that faces the inner frame 62. Openings 41 are formed in the latticed element 45, giving the latticed element 45 an appearance of an open mesh or lattice. The latticed element 45 is recessed relative to opposed ends of the sidewall 43, and the outer cover 32 overlies the latticed element outward facing surface 46 so as to reside within the outward-facing recess.

The intermediate frame 42 supports some module components including the cell connection system (CSS) in a desired position relative to the cells 20. To this end, some openings 41 formed in the latticed element 45 are positioned to correspond to the locations of access openings 61 of the inner frame 62, which in turn correspond to locations of terminals 25, 26 and vents 27 of the cells 20. In particular, at least some of the latticed element openings 41 and inner frame access openings 61 are in alignment along a direction perpendicular to the inward- and outward-facing surfaces 46, 47 of the latticed element 45.

The intermediate frame 42 includes frame latches 48 that depend from the inner frame facing end of the sidewall 43. In particular, the frame latches 48 protrude in a direction normal to the inward-facing surface 47 of the latticed element 45, and terminate in hooked ends 49 that are configured to be received in and engage with latch openings 70 provided along a skirt 67 of the inner frame 62. The hooked ends 49 cooperate with the latch openings 70 by a snap fit connection to retain the intermediate frame 42 on an outward-facing surface 64 of inner frame 62.

The inner frame 62 supports the outer cover 32 and intermediate frame 42, and is used to secure the cell array 29 to the battery pack housing 100. The inner frame 62 includes an inner plate 63, a skirt 67 that surrounds a peripheral edge 66 of the inner plate 63, and feet 72 that protrude outward from the skirt 67. The inner plate 63 is generally rectangular in shape to correspond to the shape of the upper end of the cell array 29. The inner plate 63 has an inner plate outward-facing surface 64 that faces the intermediate frame 42, and an opposed inner plate inward-facing surface 65 that faces the cell array 29. In addition, access openings 61 are formed in the inner plate 63 that are spaced apart from the inner plate peripheral edge 66. In the illustrated embodiment, an access opening 61 is provided for, and overlies, each terminal 25, 26 of each cell 20 as well as the vent 27 of each cell 20. The opening 61 is shaped and dimensioned to generally correspond to, or be slightly larger than, that of the structure (terminal or vent) it overlies.

The skirt 67 protrudes from the inner plate peripheral edge 66 in a direction normal to the inner plate inward-facing surface 65. For example, the illustrated orientation, the skirt 67 depends from the inner plate peripheral edge 66. The skirt 67 includes a skirt inward-facing surface 69 that is joined to the inner plate peripheral edge 66, and a skirt outward-facing surface 68 that is opposed to the skirt inward-facing surface 69. Spaced-apart latch openings 70 are formed in the skirt 67 that are configured to receive and engage the hooked ends 49 of the frame latches 48 in a snap fit connection, whereby the intermediate frame 42 is secured to the inner frame 62.

The intermediate frame sidewall 43 is dimensioned to be generally the same dimensions as a peripheral dimension of the inner frame 62 such that the frame latches 48 face the skirt outward-facing surface 68 while the hooked ends 49 of the frame latches 48 are received in, and engaged with, the latch openings 70.

The inner frame 62 includes four feet 72, one at each corner of the inner plate 63. Each foot 72 extends outward from the skirt outward-facing surface 68, and is positioned on an end of the skirt 67 that is opposed to the inner plate 63. Thus each foot 72 is spaced apart from the inner plate 63, and a foot offset of (FIG. 1) is defined as the distance between each foot 72 and the inner plate 63 in a direction perpendicular to the inner plate outward-facing surface 64.

Each foot 72 extends outward in a direction parallel to the inner plate 63, and is supported relative to the skirt 67 by a triangular gusset 74. In particular, two of the feet 72(1), 72(2) extend outward in a first direction from one end of the inner frame 62, for example an end corresponding to the location of the first end plate 14. In addition, two of the feet 72(3), 72(4) extend outward in a second direction from the opposed end of the inner frame 62, for example an end corresponding to the location of the second end plate 16. Each foot 72 includes an opening 73 that is configured to receive a fastener such as a screw, permitting the inner frame 62 to be secured to a support structure.

In use, each foot 72 is secured to the rails 101, 102 of the battery pack housing 100 using a fastener (not shown). In particular, each foot 72 is secured to the support surface 104 of a corresponding rail 101, 102.

In some embodiments, it is desirable to apply a compressive force to the first ends 22 of the cells 20 of the cell array 29. To this end, the inner frame 62 is configured such that a sum of the foot offset of and the support offset $o_s$ is less than the cell height $h_c$, whereby the inner frame 62 applies a compressive force to the cell array 29. Moreover, because the access opening 61 of the inner frame 62 are slightly larger than, and aligned with, the terminals 25, 26 and the vent 27 of each cell 20, the force is applied to the cell housing 21 rather than to the terminals 25, 26 or the vent 27 of each cell 20.

The inner frame 62 is a rigid, load carrying and distributing member. For this reason, in some embodiments, the inner frame is formed of, for example, steel or other suitable material. The intermediate frame 42 serves as a scaffold that supports the CSS and other ancillary structures relative to the first ends of the cells. Since it is disposed between the outer cover 32 and the supportive inner frame 62, the intermediate frame 42 can be formed of a thin, lightweight material such as, for example, plastic or other suitable material.

A method of supporting the cell array within the battery pack housing 100 includes disposing the cells 20 in the module housing 3, and disposing the module housing 3 within the battery pack housing 100 between a pair of rails 101, 102 of the battery pack housing 100. As previously discussed, the cells 20 are arranged within the module housing 3 such that the sidewall 24 of one cell 20 faces the sidewall 24 of an adjacent cell 20, and the sidewalls 24 of the outermost cells 20 of the cell array face a corresponding end plate 14, 16. The band 4 surrounds a lower end of cell array and the end plates 14, 16. In addition, the cover assembly 30 is disposed on the cell array such that the inner frame 62 overlies the first end of the cells 20 and partially surrounds a sidewall 24 of the cells 20, as well as a portion of the end plates 14, 16. Each foot 72 of the inner frame 62 is secured to a corresponding rail support surface 104. By controlling the dimensions of the support offset $o_s$ and the foot offset $o_f$ such that the sum of the foot offset $o_f$ and the support offset $o_s$ is less than the cell height $h_c$, the inner frame 62 can apply a compressive force to the first end of the cells 20 of the cell array 29. Moreover, since the intermediate frame 42 and the outer cover 32 are secured to an outward facing surface of the inner frame 62, the outer cover 32 and intermediate frame 42 are free of the compressive force applied to the first end of the cells 20 of the cell array 29. This arrangement improves the function, durability and reliability of the ancillary structures supported within the cover assembly 30.

Although the cells 20 are described as housing the electrode assembly 4 having a jelly roll electrode configuration, the electrode assembly 4 is not limited to this electrode configuration. For example, the electrode assembly 4 may include a stacked or folded arrangement of electrode plates, or other suitable electrode arrangement.

Although the cells 20 are described as being lithium ion cells, the cells 20 are not limited to this type of cell. For example, the cells 20 may include different combinations of electrode materials and electrolytes, including lead-acid, nickel cadmium (NiCd), nickel metal hydride (NiMH), and lithium ion polymer.

Although the illustrated embodiment includes fourteen cells 20 in the cell array 29, the battery module 2 is not limited to having fourteen cells 20. The number of cells 20 used may be greater or fewer than fourteen, and is determined by the requirements of the specific application.

Selective illustrative embodiments of a battery system including the battery pack, battery module and cell are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery system been described above, the battery system is not limited to the working examples described above, but various design alterations may be carried out without departing from the devices as set forth in the claims.

What is claimed is:

1. A battery module configured to support an array of electrochemical cells, the module comprising a cover assembly, the cover assembly including
   an outer cover,
   an inner frame, the inner frame including
      an inner plate having an inner plate outward-facing surface that is bordered by an inner plate peripheral edge, the inner plate having access openings formed in the inner plate outward-facing surface that are spaced apart from the inner plate peripheral edge,
      a skirt protruding from the inner plate peripheral edge in a direction perpendicular to the inner plate outward-facing surface, the skirt including a skirt inward-facing surface that is joined to the inner plate peripheral edge, and a skirt outward-facing surface that is opposed to the skirt inward-facing surface, and
      a foot extending outward from the skirt outward-facing surface, the foot extending in a direction parallel to the inner plate, and
   an intermediate frame disposed between the outer cover and the inner frame, the intermediate frame being secured to the inner frame by a first snap-fit connection, and the outer cover being secured to the intermediate frame by a second snap-fit connection.

2. The battery module of claim 1, wherein the intermediate frame comprises
   a sidewall,
   a latticed element extending between opposed inner surfaces of the sidewall, the latticed element including a first surface facing the outer cover and a second surface facing the inner frame, and
   the latticed element includes lattice openings that align with the access openings in a direction perpendicular to the first surface.

3. The battery module of claim 1, wherein the intermediate frame comprises
   a sidewall,
   a latticed element extending between opposed inner surfaces of the sidewall, the latticed element including a first surface facing the outer cover and a second surface facing the inner frame, and frame latches that depend from the sidewall in a direction normal to the second surface, the frame latches providing a portion of the first snap fit connection.

4. The battery module of claim 3, wherein the skirt includes spaced-apart latch openings that provide another portion of the first snap fit connection, and are configured to receive and engage the frame latches, whereby the intermediate frame is secured to the inner frame.

5. The battery module of claim 3, wherein the outer cover comprises
an outer plate having an outer plate outward-facing surface, an outer plate inward facing surface that is opposed to the outer plate outward-facing surface and faces the intermediate frame, and an outer plate peripheral edge that extends between the outer plate outward facing surface and the outer plate inward-facing surface,
outer cover latches that depend from the outer plate peripheral edge in a direction normal to the outer plate inward-facing surface, the outer cover latches providing a portion of the second snap fit connection,
wherein the outer plate peripheral edge faces an inner surface of the intermediate frame sidewall, and the outer cover latches are received in, and engage with, recesses formed in an edge of the intermediate frame sidewall, the recesses providing another portion of the second snap fit connection.

6. The battery module of claim 1, wherein a gusset extends between the skirt and the foot.

7. A battery pack comprising
a battery pack housing, and
a battery module disposed within the battery pack housing, the battery module comprising a cover assembly, the cover assembly including
an outer cover,
an inner frame, the inner frame including
an inner plate having an inner plate outward-facing surface that is bordered by an inner plate peripheral edge, the inner plate having access openings formed in the inner plate outward-facing surface that are spaced apart from the inner plate peripheral edge,
a skirt protruding from the inner plate peripheral edge in a direction perpendicular to the inner plate outward-facing surface, the skirt including a skirt inward-facing surface that is joined to the inner plate peripheral edge, and a skirt outward-facing surface that is opposed to the skirt inward-facing surface, and
a foot extending outward from the skirt outward-facing surface, the foot extending in a direction parallel to the inner plate, and
an intermediate frame disposed between the outer cover and the inner frame, the intermediate frame being secured to the inner frame by a first snap-fit connection, and the outer cover being secured to the intermediate frame by a second snap-fit connection.

8. The battery pack of claim 7, wherein the intermediate frame comprises
a sidewall,
a latticed element extending between opposed inner surfaces of the sidewall, the latticed element including a first surface facing the outer cover and a second surface facing the inner frame, and
the latticed element includes lattice openings that align with the access openings in a direction perpendicular to the first surface.

9. The battery pack of claim 7, wherein the intermediate frame comprises
a sidewall,
a latticed element extending between opposed inner surfaces of the sidewall, the latticed element including a first surface facing the outer cover and a second surface facing the inner frame, and
frame latches that depend from the sidewall in a direction normal to the second surface, the frame latches providing a portion of the first snap fit connection.

10. The battery pack of claim 9, wherein the skirt includes spaced-apart latch openings that provide another portion of the first snap fit connection, and are configured to receive and engage the frame latches, whereby the intermediate frame is secured to the inner frame.

11. The battery pack of claim 9, wherein the outer cover comprises
an outer plate having an outer plate outward-facing surface, an outer plate inward facing surface that is opposed to the outer plate outward-facing surface and faces the intermediate frame, and an outer plate peripheral edge that extends between the outer plate outward facing surface and the outer plate inward-facing surface,
outer cover latches that depend from the outer plate peripheral edge in a direction normal to the outer plate inward-facing surface, the outer cover latches providing a portion of the second snap fit connection,
wherein the outer plate peripheral edge faces an inner surface of the intermediate frame sidewall, and the outer cover latches are received in, and engage with, recesses formed in an edge of the intermediate frame sidewall, the recesses providing another portion of the second snap fit connection.

12. The battery pack of claim 7, wherein a gusset extends between the skirt and the foot.

13. The battery pack of claim 7, wherein the battery pack housing cooperates with the cover assembly to support the array of electrochemical cells.

14. The battery pack of claim 7, wherein the battery pack housing includes
electrochemical cells disposed in the module housing,
a base on which the array of electrochemical cells is supported, and
a support surface that is disposed between the inner plate and the base, a distance between the support surface and the base in a direction perpendicular to the plate outward-facing surface defining a support offset,
wherein
the foot is secured to the support surface,
the distance between the foot and the inner plate in a direction perpendicular to the plate outward-facing surface defining a foot offset, and
a sum of the foot offset and support offset is less than a dimension of one of the electrochemical cells in a direction perpendicular to the plate outward-facing surface whereby the inner frame applies a compressive force to the electrochemical cells.

15. The battery pack of claim 14, wherein the support offset has a value that is greater than zero.

16. The battery pack of claim 14, wherein the electrochemical cells are in direct contact with the base.

* * * * *